United States Patent
Kurata et al.

(10) Patent No.: US 9,984,681 B2
(45) Date of Patent: *May 29, 2018

(54) METHOD FOR IMPROVING ACOUSTIC MODEL, COMPUTER FOR IMPROVING ACOUSTIC MODEL AND COMPUTER PROGRAM THEREOF

(71) Applicant: International Business Machines Corporation, Armonk, NY (US)

(72) Inventors: Gakuto Kurata, Tokyo (JP); Toru Nagano, Tokyo (JP); Masayuki Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/678,195

(22) Filed: Aug. 16, 2017

(65) Prior Publication Data

US 2017/0345415 A1 Nov. 30, 2017

Related U.S. Application Data

(63) Continuation of application No. 14/969,340, filed on Dec. 15, 2015, which is a continuation of application No. 14/924,772, filed on Oct. 28, 2015.

(30) Foreign Application Priority Data

Nov. 27, 2014 (JP) .................................. 2014-239521

(51) Int. Cl.
*G10L 15/02* (2006.01)
*G10L 21/0208* (2013.01)
(Continued)

(52) U.S. Cl.
CPC ............ *G10L 15/063* (2013.01); *G10L 15/02* (2013.01); *G10L 21/0208* (2013.01);
(Continued)

(58) Field of Classification Search
None
See application file for complete search history.

(56) References Cited

U.S. PATENT DOCUMENTS 5,742,928 A * 4/1998 Suzuki .................... G10L 15/20
704/225
5,864,809 A * 1/1999 Suzuki .................... G10L 15/20
704/233

(Continued)

FOREIGN PATENT DOCUMENTS

| JP | H05232985 A | 9/1993 |
| JP | H06175678 A | 6/1994 |

(Continued)

OTHER PUBLICATIONS

Decision to Grant a Patent, Patent Application No. 2014-239521, Date of Drafting: Jul. 15, 2016, 6 pages.

(Continued)

*Primary Examiner* — Paras D Shah
*Assistant Examiner* — Thuykhanh Le
(74) *Attorney, Agent, or Firm* — Daniel C. Housley

(57) ABSTRACT

Embodiments include methods and systems for improving an acoustic model. Aspects include acquiring a first standard deviation value by calculating standard deviation of a feature from first training data and acquiring a second standard deviation value by calculating standard deviation of a feature from second training data acquired in a different environment from an environment of the first training data. Aspects also include creating a feature adapted to an environment where the first training data is recorded, by multi- (Continued)

plying the feature acquired from the second training data by a ratio obtained by dividing the first standard deviation value by the second standard deviation value. Aspects further include reconstructing an acoustic model constructed using training data acquired in the same environment as the environment of the first training data using the feature adapted to the environment where the first training data is recorded.

2 Claims, 10 Drawing Sheets

(51) Int. Cl.
| | |
|---|---|
| *G10L 25/18* | (2013.01) |
| *G10L 15/06* | (2013.01) |
| *G10L 15/065* | (2013.01) |
| *G10L 15/187* | (2013.01) |
| *G10L 25/24* | (2013.01) |

(52) U.S. Cl.
CPC ............ *G10L 25/18* (2013.01); *G10L 15/065* (2013.01); *G10L 15/187* (2013.01); *G10L 25/24* (2013.01); *G10L 2015/025* (2013.01)

(56) References Cited

U.S. PATENT DOCUMENTS

| | | | | |
|---|---|---|---|---|
| 6,233,550 | B1* | 5/2001 | Gersho | G10L 19/10 704/208 |
| 6,965,780 | B1* | 11/2005 | Monogioudis | H04W 52/12 455/506 |
| 7,120,580 | B2* | 10/2006 | Rao Gadde | G10L 15/20 704/233 |
| 8,140,333 | B2* | 3/2012 | Han | G10L 15/144 704/245 |
| 8,175,877 | B2* | 5/2012 | Gilbert | G10L 15/20 704/226 |
| 8,527,602 | B1* | 9/2013 | Rasmussen | H04N 21/440263 709/207 |
| 8,805,684 | B1* | 8/2014 | Aleksic | G10L 15/07 704/231 |
| 2003/0088401 | A1* | 5/2003 | Terez | G10L 25/90 704/207 |
| 2004/0098247 | A1* | 5/2004 | Moore | G06F 17/2818 704/4 |
| 2005/0102135 | A1* | 5/2005 | Goronzy | G10L 15/00 704/213 |
| 2006/0004521 | A1* | 1/2006 | Bankhead | G01V 1/28 702/14 |
| 2006/0074655 | A1* | 4/2006 | Bejar | G10L 15/063 704/243 |
| 2007/0129943 | A1* | 6/2007 | Lei | G10L 15/065 704/240 |
| 2007/0233474 | A1* | 10/2007 | Song | G10L 19/26 704/219 |
| 2009/0204395 | A1* | 8/2009 | Kato | G10L 13/033 704/206 |
| 2010/0174533 | A1* | 7/2010 | Pakhomov | G10L 17/26 704/205 |
| 2011/0015925 | A1* | 1/2011 | Xu | G10L 15/20 704/233 |
| 2011/0153313 | A1* | 6/2011 | Etter | G10L 25/69 704/200.1 |
| 2011/0270612 | A1* | 11/2011 | Yoon | G09B 19/06 704/251 |
| 2012/0197631 | A1* | 8/2012 | Ramani | G06F 17/2755 704/9 |
| 2012/0271631 | A1* | 10/2012 | Weng | G10L 15/063 704/243 |
| 2013/0066631 | A1* | 3/2013 | Wu | G10L 13/08 704/258 |
| 2015/0058010 | A1* | 2/2015 | Gunawan | G10L 21/0316 704/236 |
| 2016/0042734 | A1* | 2/2016 | Cetinturk | G10L 15/02 704/236 |
| 2016/0155438 | A1 | 6/2016 | Kurata et al. | |
| 2016/0180836 | A1 | 6/2016 | Kurata et al. | |

FOREIGN PATENT DOCUMENTS

| | | | |
|---|---|---|---|
| JP | H10288996 A | | 10/1998 |
| JP | 2005196020 | * | 7/2005 |
| JP | 2005196020 A | | 7/2005 |
| JP | 2008309945 A | | 12/2008 |
| JP | 2009216760 A | | 9/2009 |

OTHER PUBLICATIONS

Notification of Reasons for Refusal, Patent Application No. 2014-239521, Date of Drafting: Apr. 12, 2016, 6 pages.
Kurata et al., "Method for Improving Acoustic Model, Computer for Improving Acoustic Model and Computer Program Thereof", Patent Application No. 2014-239521, Filed Nov. 27, 2014, 59 pages.
Li et. al., "Incremental On-Line Feature Space MLLR Adaptation for Telephony Speech Recognition", INTERSPEECH 2002 Retrieved from: http://people.sabanciuniv.edu/haerdogan/pubs/li02iof.pdf; 4 pgs.
Viikki et. al., "Cepstral domain segmental feature vector normalization for noise robust speech recognition", Speech Communication, 1998, vol. 25, Issues 1-3, Aug. 1998; pp. 133-147.
Kurata et al., "Method for Improving Acoustic Model, Computer for Improving Acoustic Model and Computer Program Thereof", U.S. Appl. No. 15/678,187, filed Aug. 16, 2017.
List of IBM Patents or Patent Applications Treated as Related, dated Aug. 14, 2017, pp. 1-2.

* cited by examiner

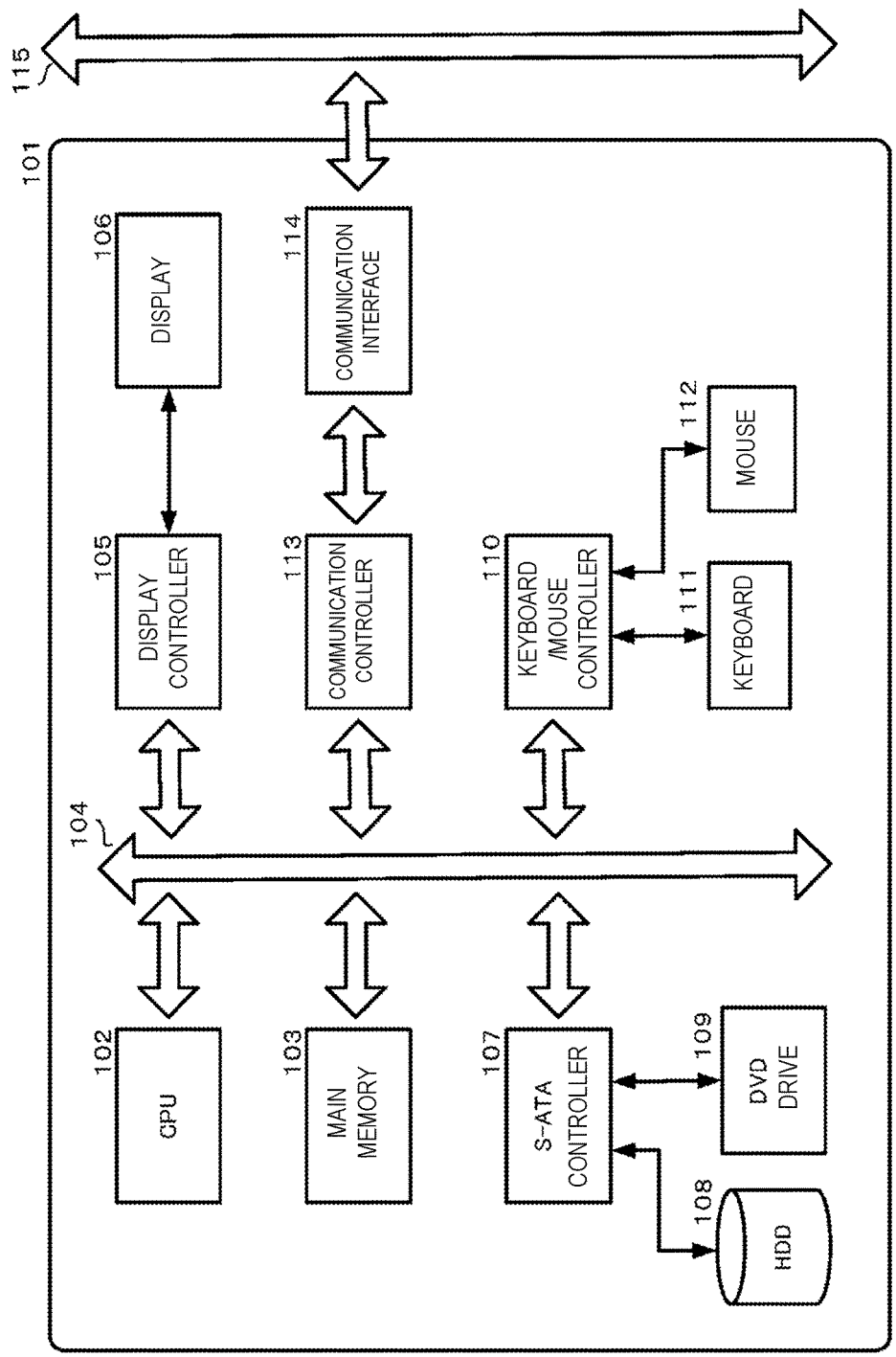
[FIGURE 1A]

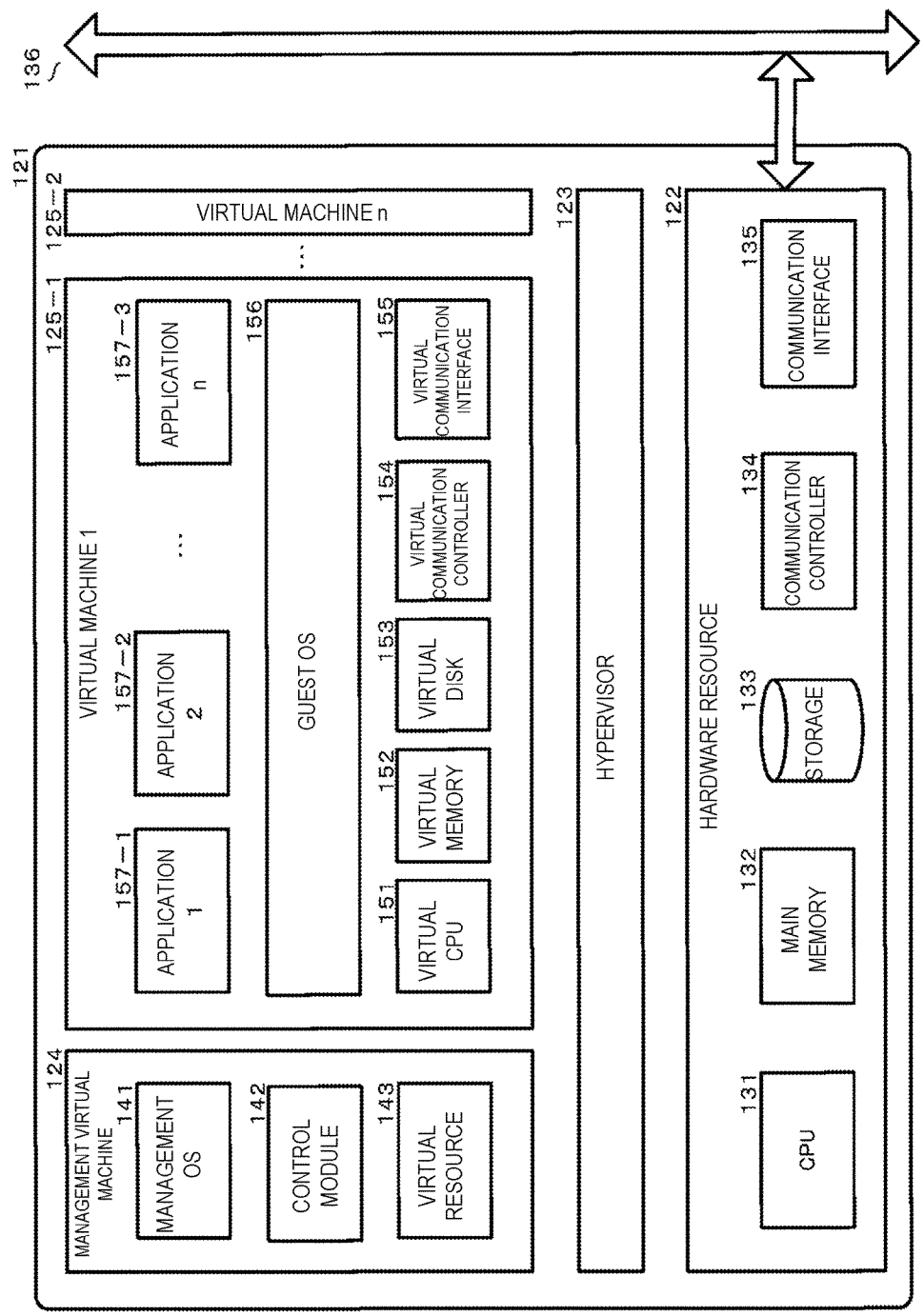
[FIGURE 1B]

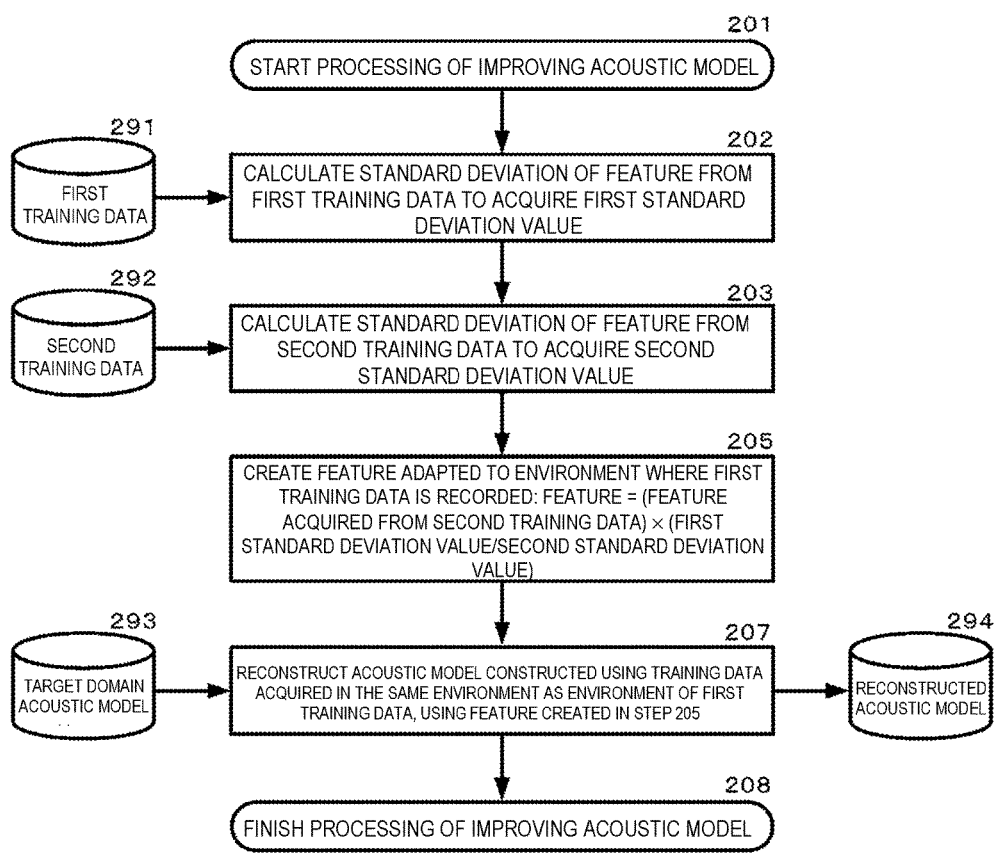
[Figure 2A]

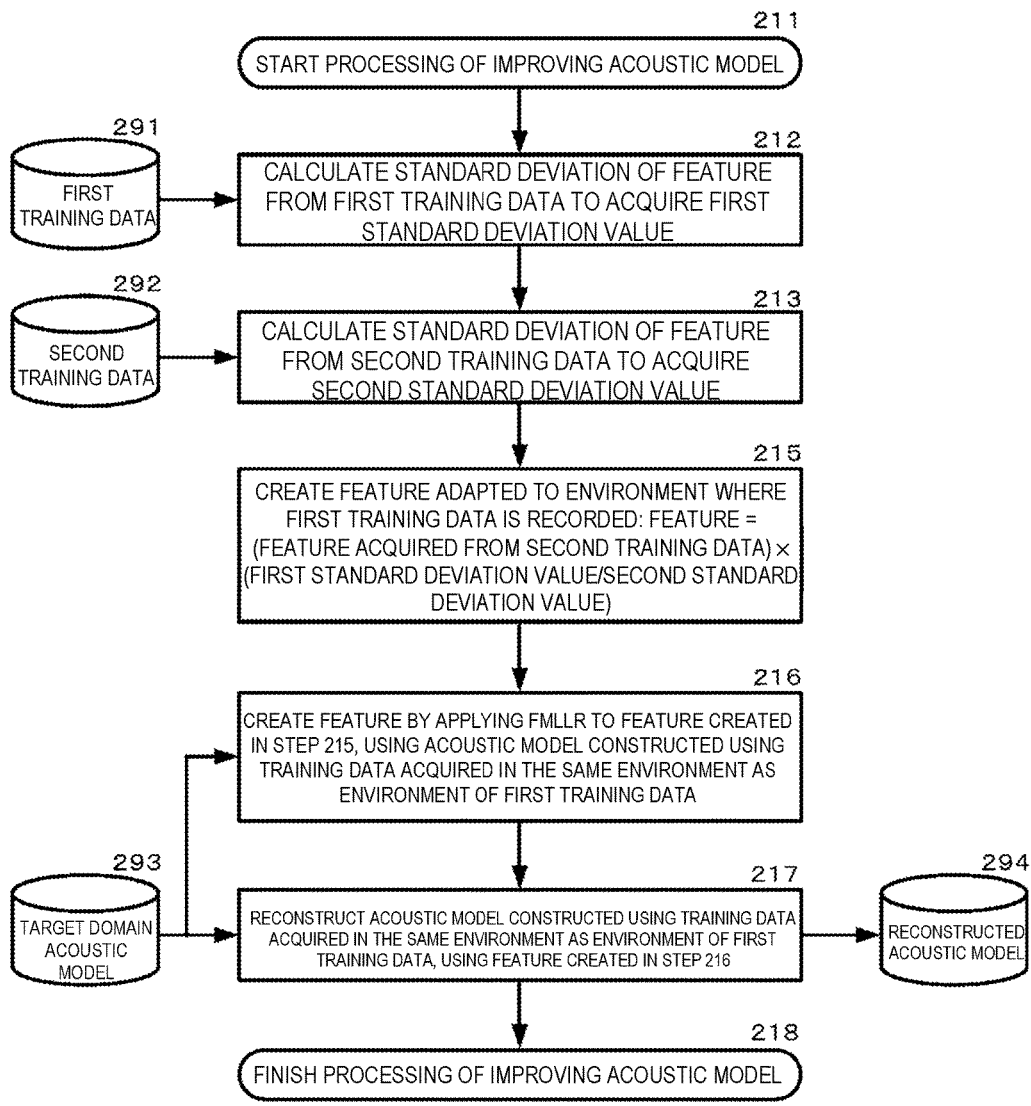

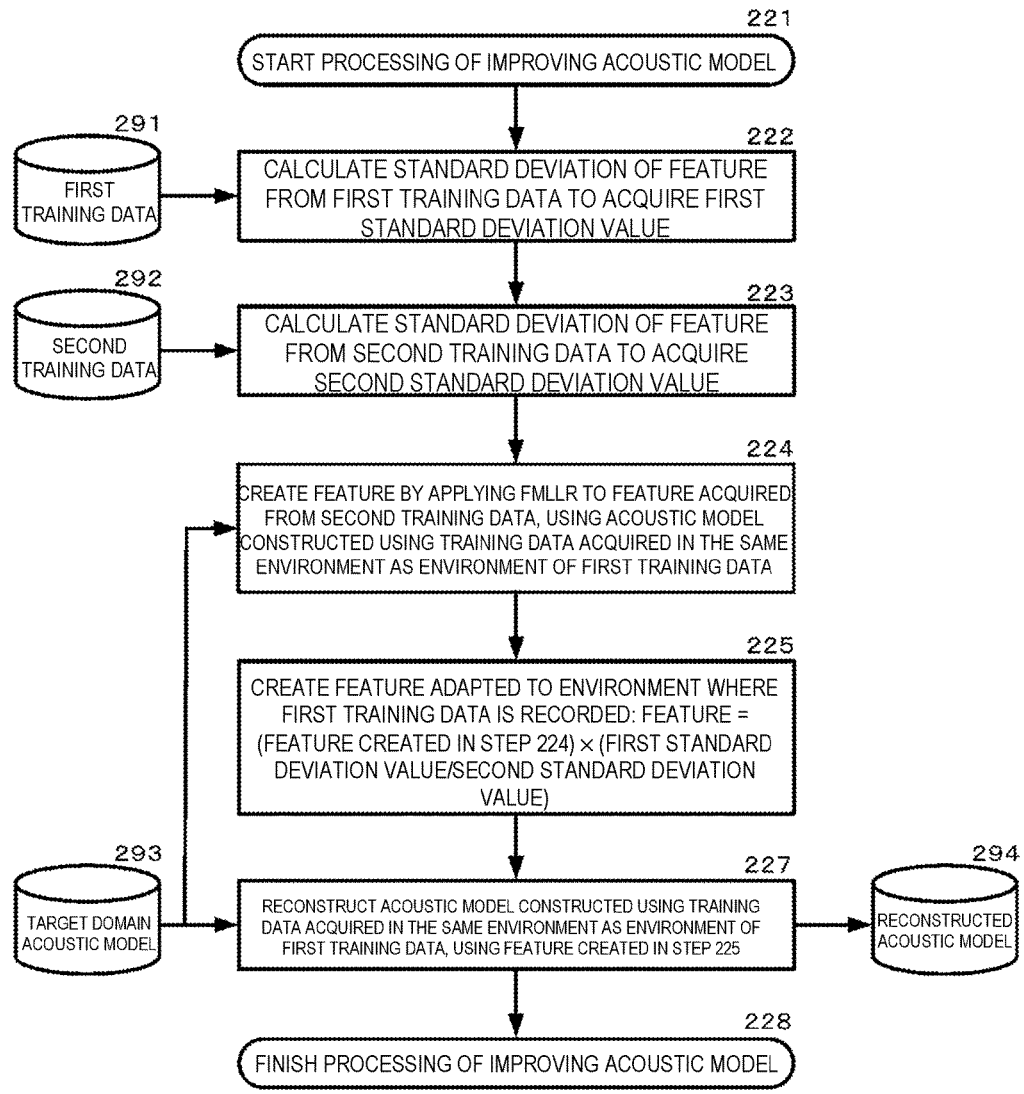
[Figure 2C]

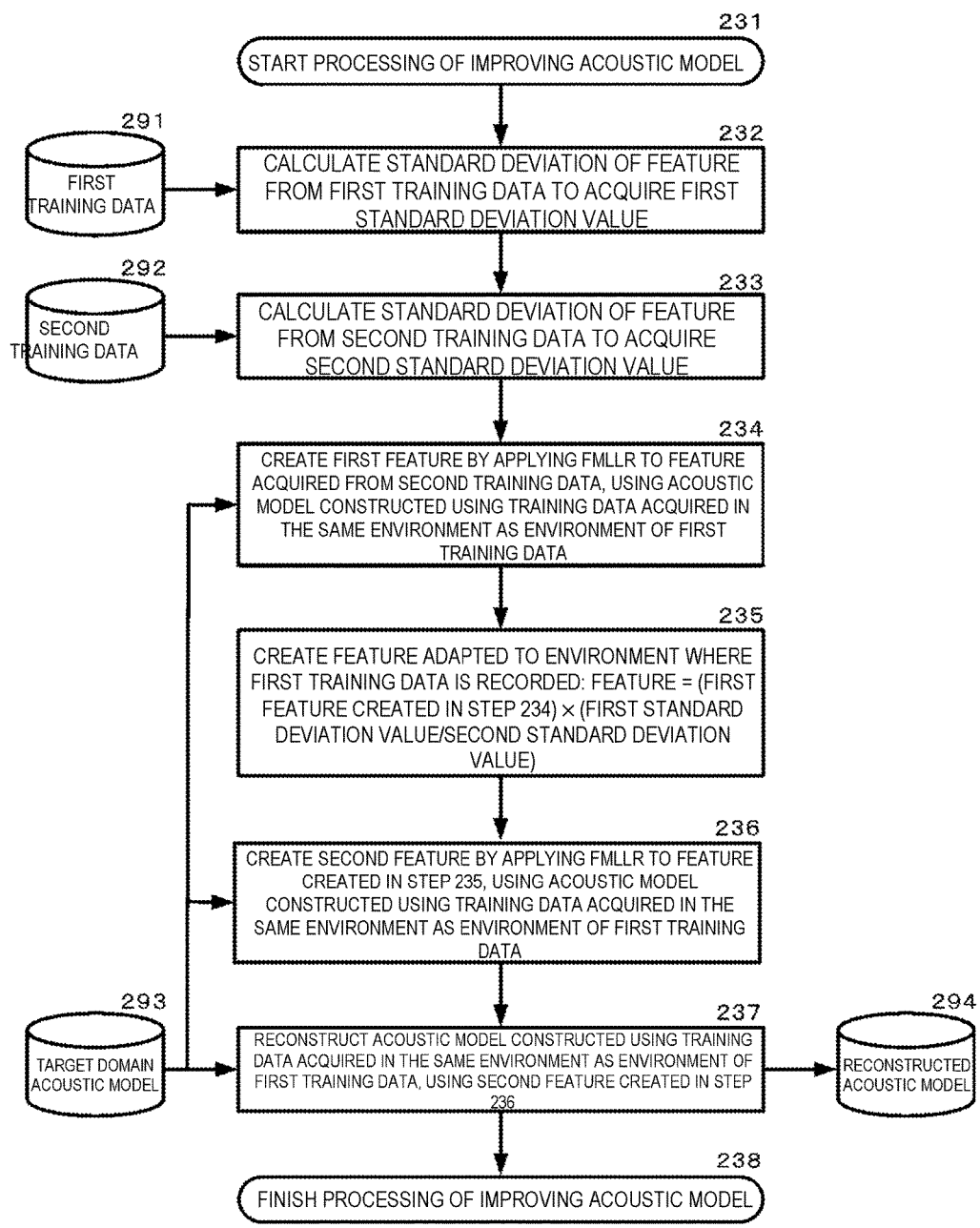

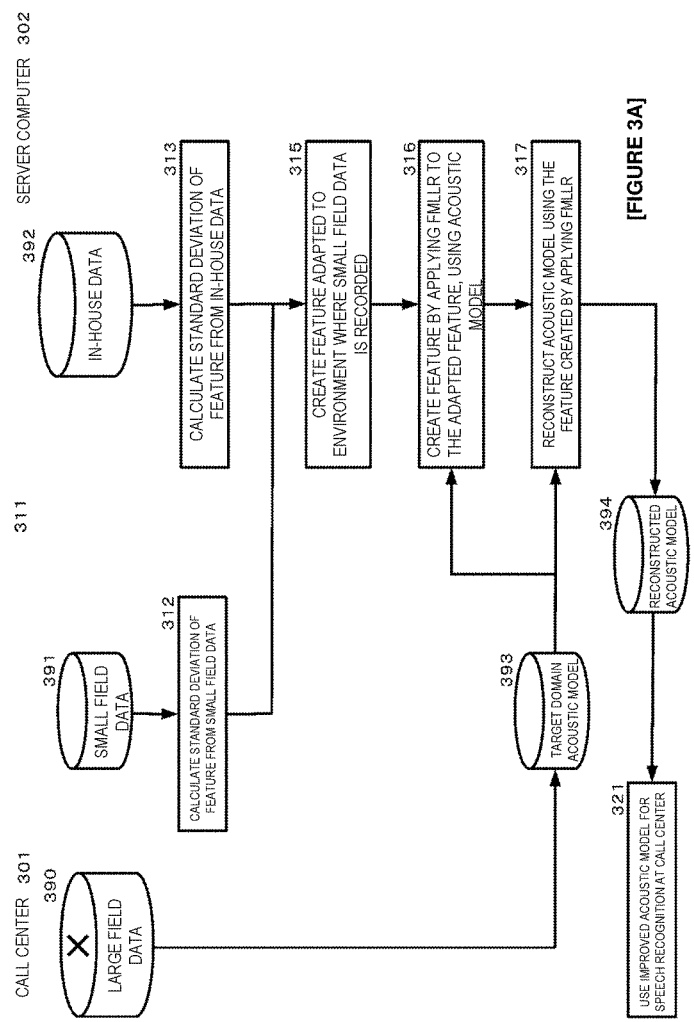
[FIGURE 3A]

| | ACOUSTIC MODEL | CALL CENTER A CER [%] | CALL CENTER B CER [%] |
|---|---|---|---|
| COMPARISON EXAMPLE 1 | TARGET DOMAIN ACOUSTIC MODEL | 34.2 | 54.0 |
| COMPARISON EXAMPLE 2 | ONLY FMLLR | 33.9 | DEGRADATION |
| EXAMPLE 1 | ASPECT ILLUSTRATED IN FIGURE 2A (FMLLR IS NOT APPLIED) | 34.0 | 48.8 |
| EXAMPLE 2 | ASPECT ILLUSTRATED IN FIGURE 2B (FMLLR IS APPLIED) | 33.6 | 48.0 |

[FIGURE 3B]

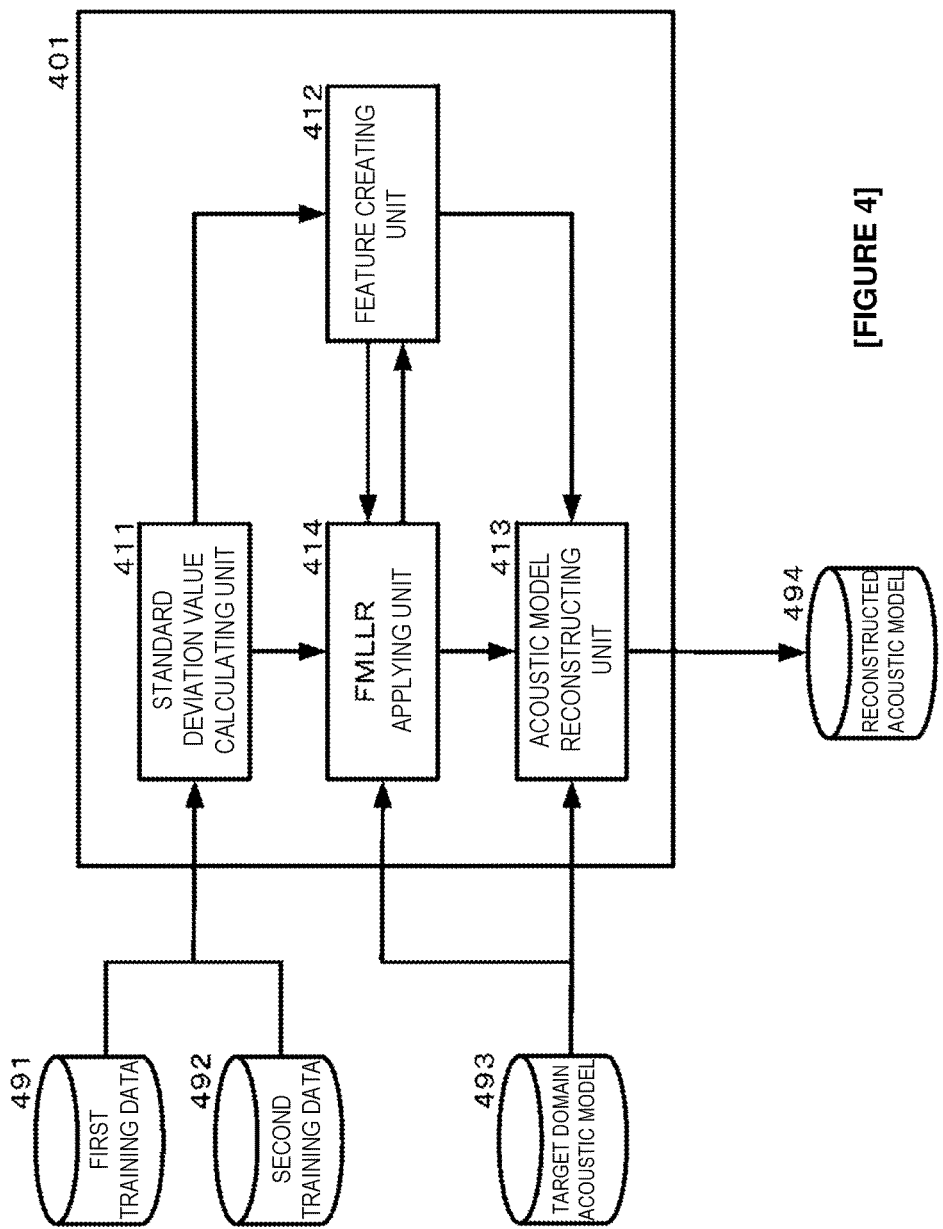

[Figure 5]
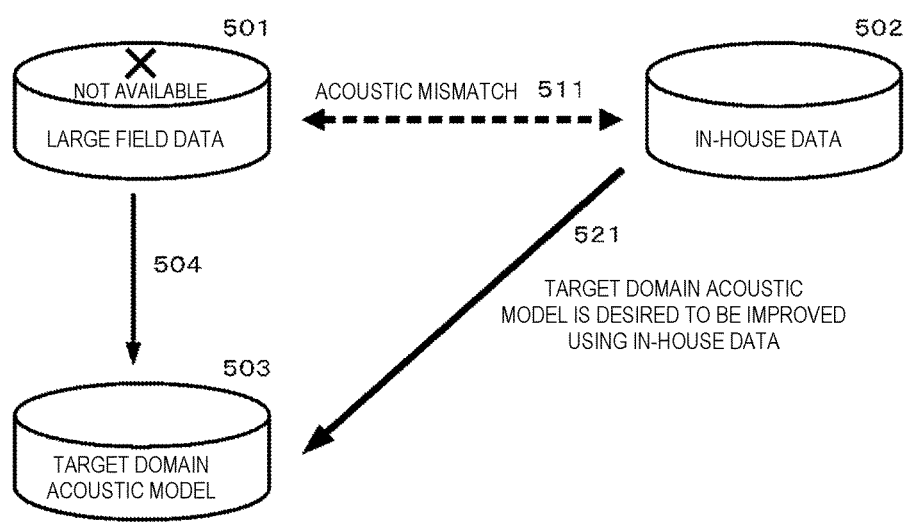

METHOD FOR IMPROVING ACOUSTIC MODEL, COMPUTER FOR IMPROVING ACOUSTIC MODEL AND COMPUTER PROGRAM THEREOF

BACKGROUND

The present invention relates to a field of speech recognition, more particularly, to a technique for improving an acoustic model used in speech recognition.

In speech recognition, a statistical method is used. The statistical method is a method in which features of speech are accumulated from training data which is a recorded large amount of speech data, and a word sequence which is the closest to the features is output as a recognition result while comparing input speech signals with the accumulated features. Typically, acoustic features of the speech are often dealt with separately from linguistic features. The acoustic features represent what kind of frequency property each phoneme of a recognition target has, and are referred to as an acoustic model (AM).

One technique for converting a cepstrum so as to match an acoustic model, feature space maximum likelihood linear regression (hereinafter, also referred to as "FMLLR") is known. The cepstrum which is a feature widely used in speech recognition, is a signal obtained by performing inverse fast Fourier transform (IFFT) on a logarithmic power spectrum of an observation signal for separating a signal of fine frequency property (for example, vocal cord vibration) from a signal which is an observed signal that has passed through a filter having smooth frequency property (for example, a vocal tract).

BRIEF SUMMARY

Embodiments include methods, systems and computer program products for improving an acoustic model. Aspects include acquiring a first standard deviation value by calculating standard deviation of a first feature from a first training data acquired in first environment and acquiring a second standard deviation value by calculating standard deviation of a second feature from second training data acquired in a second environment. Aspects also include calculating a modified first feature, by multiplying the second feature acquired from the second training data by a ratio obtained by dividing the first standard deviation value by the second standard deviation value and reconstructing, by the computer, an acoustic model constructed using training data acquired in the first environment, using the modified first feature.

BRIEF DESCRIPTION OF DRAWINGS

FIG. 1A is a diagram illustrating an example of a computer used in aspects of the present invention or a computer according to the aspects of the present invention;

FIG. 1B is a diagram illustrating an example of the computer used in the aspects of the present invention or the computer according to the aspects of the present invention in a case where one or a plurality of virtual machines are made to operate on the computer;

FIG. 2A is a flowchart for processing of improving an acoustic model according to the aspects of the present invention;

FIG. 2B is a flowchart for processing of improving an acoustic model according to the aspects of the present invention;

FIG. 2C is a flowchart for processing of improving an acoustic model according to the aspects of the present invention;

FIG. 2D is a flowchart for processing of improving an acoustic model according to the aspects of the present invention;

FIG. 3A is a diagram for processing of improving an acoustic model of a call center according to the aspects of the present invention;

FIG. 3B illustrates a character error rate in a case where the acoustic model of the call center is improved and the improved acoustic model is used, according to the aspects of the present invention;

FIG. 4 illustrates an example of a functional block diagram of a computer which preferably has a hardware structure according to FIG. 1A or FIG. 1B and which implements the aspects of the present invention; and FIG. 5 illustrates that when large field data is not available, there is acoustic mismatch between the large field data and the in-house data even using the in-house data in prior art.

DETAILED DESCRIPTION

Embodiments of the present invention will be described below according to the drawings. In the following description according to the drawings, the same reference numerals indicate the same objects unless there is notice. It should be appreciated that the embodiments of the present invention are provided for explaining preferred embodiments of the present invention, and are not intended to limit the scope of the present invention.

FIG. 1A illustrates an example of a computer which can be used in the aspects of the present invention or a computer according to the aspects of the present invention. While the computer can be, for example, one or a plurality of computers, for example, a server computer (for example, a computer provided with a server function), the computer is not limited to these.

A computer (101) includes one or a plurality of CPUs (102) and a main memory (103), which are connected to a bus (104). The CPU (102) is, for example, based on architecture of 32 bits or 64 bits. The CPU (102) can be, for example, Power™ series of International Business Machines Corporation, Xeon® series, Core™ i series, Core™ two series, Pentium® series, Celeron® series, or Atom™ series of Intel Corporation, or Opteron™ series, A series, Phenom™ series, Athlon™ series, Turion® series, or Sempron™ of AMD (Advanced Micro Devices), Inc.

A display (106), for example, a liquid crystal display (LCD) can be connected to the bus (104) via a display controller (105). Further, the liquid crystal display (LCD) may be, for example, a touch panel display or a floating touch display. The display (106) can be used to display an object which can be displayed through operation of software running on the computer (101) (for example, a computer program according to the aspects of the present invention or arbitrary various computer programs running on the computer (101)), using appropriate graphic interface. Further, the display (106) can output a screen of, for example, web browser application.

Arbitrarily, a disk (108), for example, a hard disk or a solid state drive (SSD) can be connected to the bus (104) via, for example, a SATA or an IDE controller (107). Arbitrarily, a drive (109), for example, a CD, a DVD or a BD drive can be connected to the bus (104) via, for example, the SATA or the IDE controller (107). Arbitrarily, a keyboard (111) and a mouse (112) can be connected to the bus (104) via a peripheral device controller (110), via, for example, a keyboard mouse controller or a USB bus.

In the disk (108), an operating system, for example, an operating system developed for a main frame (for example, z/OS, z/VM or z/VSE), Windows®, UNIX®, Linux®, MacOS®, and Android®, and a Java® processing environment such as J2EE, Java® application, a Java® virtual machine (VM), a program providing a (JIT) compiler upon execution of Java®, a computer program according to the aspects of the present invention, and other arbitrary various computer programs, and data can be stored so as to be able to be loaded to the main memory (103).

Further, in the disk (108), software which enables processing of improving an acoustic model according to the aspects of the present invention can be stored so as to be able to be loaded to the main memory (103). The disk (108) may be incorporated into the computer (101), or the computer (101) may be connected via a cable so as to be able to access the disk (108), or the computer (101) may be connected via a wired or wireless network so as to be able to access the disk (108). The drive (109) can be used as necessary for installing a program, for example, an operating system, an application program, or the computer program according to the aspects of the present invention from a CD-ROM, a DVD-ROM, or a BD in the disk (108).

The communication interface (114) conforms to, for example, an Ethernet® protocol. The communication interface (114) is connected to the bus (104) via the communication controller (113), and plays a role of connecting the computer (101) to the communication line (115) in a wired or wireless manner, and provides a network interface layer to a TCP/IP communication protocol of a communication function of the operating system of the computer (101). It should be noted that the communication line can be, for example, a wireless LAN environment based on wireless LAN connection standard, a Wi-Fi wireless LAN environment such as IEEE 802.11a/b/g/n, or a mobile phone network environment (for example, a 3G, LTE, or 4G environment).

FIG. 1B illustrates an example of a computer which can be used in the aspects of the present invention or a computer according to the aspects of the present invention in a case where one or a plurality of virtual machines are made to operate on the computer. The computer can be configured as, for example, a server computer such as a work station, a rack-mount server, a blade server, a midrange and a main frame.

The computer (121) illustrated in FIG. 1B can include one or a plurality of CPUs (131), a main memory (132), a storage (133), a communication controller (134), and a communication interface (135) as hardware resources (122). The above-described one or a plurality of CPUs (131), the main memory (132), the storage (133), the communication controller (134), the communication interface (135), and the communication line (136) can respectively correspond to one or a plurality of CPUs (102), the main memory (103), the disk (108), the communication controller (113), and the communication interface (114) of the computer (101), and the communication line (115) illustrated in FIG. 1A.

Further, the computer (121) operates as a physical host machine, and can activate one or a plurality of virtual machines 1 to n (125-1 to 125-2) (also referred to as domain U or child partitions) which use the same or different OS (for example, Windows®, UNIX®, Linux®) as a guest OS (156) on a hypervisor (also referred to as a virtual monitor or a virtual OS) of virtual software (for example, VMWare®, Hyper-V®, Xen®).

Further, the computer (121) can activate a management virtual machine (124) (also referred to as domain 0 or a parent partition) on the hypervisor. The management virtual machine (124) includes a management OS (141), a control module (142) operating on the management OS (141), and a virtual resource (143). The control module (142) is a module which issues a command to the hypervisor (123). Further, the control module (142) issues a command for creating the virtual machines 1 to n (125-1 to 125-2) of a user domain and activating the guest OS (156) to the hypervisor (123) to control operation of the virtual machines 1 to n (125-1 to 125-2). The virtual resource (143) is a hardware resource (122) assigned for the management virtual machine (124).

The virtual machines 1 to n (125-1 to 125-2) include the virtual resource, the guest OS (156) and various application 1 to n (157-1 to 157-3) operating on the guest OS (156). The virtual resource includes, for example, a virtual CPU (151), a virtual memory (152), a virtual disk (153), a virtual communication controller (154), and a virtual communication interface (155).

The following FIG. 2A to FIG. 2D respectively illustrate flowcharts for processing of improving an acoustic model according to the aspects of the present invention.

The above-described acoustic model is an acoustic model created in the past, and is an acoustic model constructed in the past using training data acquired in the same environment as an environment of first training data which will be described below. The acoustic model is a target acoustic model for which accuracy is improved according to the aspects of the present invention. In the aspects of the present invention, there is a case where the acoustic model is referred to as a target domain acoustic model.

The first training data is speech data acquired under the same conditions as those of an operation environment, and can be, for example, speech data recorded under the same conditions as those of an operation environment where an acoustic model is used for speech recognition. The first training data can be, for example, part of field data (in other words, small field data) acquired in the operation environment where the acoustic model is used for speech recognition.

The second training data is speech data acquired in a different environment from an environment where the first training data is recorded, and thus, speech data acquired under different conditions from conditions of the above-described operation environment. The environment different from the environment of the first training data can be, for example, an environment different from the environment where the first training data is recorded (for example, location or recording equipment (including hardware and software for recording)). Further, the second training data can be, for example, speech data recorded under different conditions from those of the operation environment where the acoustic model is used for speech recognition. The second training data can be, for example, in-house data acquired in a different environment from the operation environment where the acoustic model is used for speech recognition.

The amount of the first training data is smaller than the amount of the second training data. For example, when the amount of the first training data is data corresponding to approximately 30 minutes, the amount of the second training data can be data corresponding to 150 minutes (it should be noted that each figure is merely an example, and the aspects of the present invention are not limited to these). Therefore, the first training data can be data which is difficult to be acquired for a reason of, for example, security, and the second training data can be data which can be easily acquired.

While the feature is, for example, a cepstrum or log mel filter bank output, the feature is not limited to these. The feature in a cepstrum domain can include, for example, a mel frequency cepstrum coefficient (MFCC) and PLP (perceptual linear predictive). The ceptstrum and the log mel filter bank output are respectively known to a person skilled in the art. The computer (101) can use, for example, an arbitrarily programmed module to execute processing of the cepstrum or the log mel filter bank output.

FIG. 2A illustrates a flowchart for processing of improving an acoustic model without using FMLLR according to the aspects of the present invention. As shown at block 201, the computer (101) starts processing of improving an acoustic model. As shown at block 202, the computer (101) reads out first training data (for example, small field data) from a recording medium (291) in which the first training data is stored, calculates a feature from the first training data, and calculates standard deviation of the feature to acquire a first standard deviation value. While small field data is required as the first training data, if the feature is a cepstrum, since a dimension of the cepstrum is low (for example, approximately 13 dimensions), a very small amount of data is required to obtain the standard deviation.

As shown at block 203, the computer (101) reads out second training data (for example, in-house data) from a recording medium (292) in which the second training data is stored, calculates a feature from the second training data, and calculates standard deviation of the feature to acquire a second standard deviation value. It should be noted that the computer (101) may execute the processing of block 202 and the processing of block 203 in parallel on, for example, different virtual environments, or may execute the processing of block 202 prior to the processing of block 203, or may execute the processing of block 203 prior to the processing of block 202.

As shown at block 205, the computer (101) multiplies the feature acquired from the second training data as shown at block 203 by the ratio obtained by dividing the first standard deviation value acquired as shown at block 202 by the second standard deviation value acquired as shown at block 203 to create a feature adapted to the environment where the first training data is recorded.

As shown at block 207, the computer (101) reads out an acoustic model constructed using training data acquired in the same environment as the environment of the first training data from a recording medium (293) in which the acoustic model is stored, and reconstructs the acoustic model read out from the recording medium (293) using the feature created as shown at block 205. The computer (101) can store the reconstructed acoustic model in a storage medium (294) in which the reconstructed acoustic model is stored. In this manner, it is possible to acquire an acoustic model for which accuracy is improved by using the acoustic model read out from the recording medium (293) as an initial value, converting the feature so that distribution of the second training data matches distribution of the first training data, and reconstructing the acoustic model using the converted feature. The reconstructed acoustic model is utilized for speech recognition in the same environment as the environment of the first training data. As shown at block 208, the computer (101) finishes processing of improving an acoustic model.

FIG. 2B illustrates a flowchart for processing of improving an acoustic model further using FMLLR after a feature adapted to the environment where the first training data is recorded is created according to the aspects of the present invention. As shown at block 211, the computer (101) starts processing of improving an acoustic model. Blocks 212, 213 and 215 respectively correspond to blocks 202, 203 and 205 in FIG. 2A. Therefore, please refer to explanation of each of blocks 202, 203 and 205 for explanation of each of blocks 212, 213 and 215.

As shown at block 216, the computer (101) reads out an acoustic model constructed using training data acquired in the same environment as the environment of the first training data from the recording medium (293) in which the acoustic model is stored, and creates a feature by applying FMLLR to the feature created as shown at block 215 using the acoustic model. The feature is generated by applying the FMLLR to the feature, for example, as follows. First, when there are an acoustic model and a given feature sequence, the computer (101) calculates an FMLLR conversion matrix which reduces mismatch of the environment between the acoustic model and the feature sequence. Then, the computer (101) generates a feature for which there is small mismatch of the environment between the acoustic model and the feature sequence by multiplying the feature sequence by the FMLLR conversion matrix.

As shown at block 217, the computer (101) reads out an acoustic model constructed using training data acquired in the same environment as the environment of the first training data from the recording medium (293) in which the acoustic model is stored, and reconstructs the acoustic model read out from the recording medium (293) using the feature created as shown at block 216. The computer (101) can store the reconstructed acoustic model in a storage medium (294) in which the reconstructed acoustic model is stored. In this manner, it is possible to acquire an acoustic model for which accuracy is improved by using the acoustic model read out from the recording medium (293) as an initial value, converting the feature so that distribution of the second training data matches distribution of the first training data, and further estimating an FMLLR conversion matrix for the acoustic model so as to match the converted feature, generating a feature by multiplying the converted feature by the FMLLR conversion matrix, and reconstructing the acoustic model using the created feature. The reconstructed acoustic model is utilized for speech recognition in the same environment as the environment of the first training data. As shown at block 218, the computer (101) finishes the processing of improving an acoustic model.

FIG. 2C illustrates a flowchart for processing of improving an acoustic model further using FMLLR prior to creation of the feature adapted to the environment where the first training data is recorded, according to the aspects of the present invention. As shown at block 221, the computer (101) starts processing of improving an acoustic model. Blocks 222 and 223 respectively correspond to blocks 202 and 203 in FIG. 2A. Therefore, please refer to explanation of each of blocks 202 and 203 for explanation of each of blocks 222 and 223.

As shown at block 224, the computer (101) reads out an acoustic model constructed using training data acquired in the same environment as the environment of the first training data from the recording medium (293) in which the acoustic model is stored, and creates a feature by applying FMLLR to the feature created as shown at block 223 using the acoustic model.

As shown at block 225, the computer (101) creates a feature adapted to the environment where the first training data is recorded, by multiplying the feature created as shown at block 224 by the ratio obtained by dividing the first standard deviation value acquired as shown at block 222 by the second standard deviation value acquired as shown at block 223.

As shown at block 227, the computer (101) reads out an acoustic model constructed using training data acquired in the same environment as the environment of the first training data from the recording medium (293) in which the acoustic model is stored, and reconstructs the acoustic model read out from the recording medium (293) using the feature created as shown at block 225. The computer (101) can store the reconstructed acoustic model in the storage medium (294) in which the reconstructed acoustic model is stored. In this manner, it is possible to acquire an acoustic model for which accuracy is improved by using the acoustic model read out from the recording medium (293) as an initial value, applying FMLLR to the feature using the acoustic model, and then, converting the feature so that distribution of the feature after the FMLLR is applied to the second training data matches distribution of the first training data, and reconstructing the acoustic model using the converted feature. The reconstructed acoustic model is utilized for speech recognition in the same environment as the environment of the first training data. As shown at block 228, the computer (101) finishes the processing of improving an acoustic model.

FIG. 2D illustrates a flowchart for processing of improving an acoustic model further using FMLLR both prior to and after creation of the feature adapted to the environment where the first training data is recorded, according to the aspects of the present invention. As shown at block 231, the computer (101) starts the processing of improving an acoustic model. Blocks 232 and 233 respectively correspond to blocks 202 and 203 in FIG. 2A. Therefore, please refer to explanation of each of blocks 202 and 203 for explanation of each of blocks 232 and 233.

As shown at block 234, the computer (101) reads out an acoustic model constructed using training data acquired in the same environment as the environment of the first training data from the recording medium (293) in which the acoustic model is stored, and creates a first feature by applying FMLLR to the feature acquired as shown at block 223 using the acoustic model.

As shown at block 235, the computer (101) creates a feature adapted to the environment where the first training data is recorded, by multiplying the first feature created as shown at block 234 by the ratio obtained by dividing the first standard deviation value acquired as shown at block 222 by the second standard deviation value acquired as shown at block 223.

As shown at block 236, the computer (101) reads out an acoustic model constructed using training data acquired in the same environment as the environment of the first training data from the recording medium (293) in which the acoustic model is stored, and creates a second feature by applying FMLLR to the feature created as shown at block 235 using the acoustic model.

As shown at block 237, the computer (101) reads out an acoustic model constructed using training data acquired in the same environment as the environment of the first training data from the recording medium (293) in which the acoustic model is stored, and reconstructs the acoustic model read out from the recording medium (293) using the second feature created as shown at block 236. The computer (101) can store the reconstructed acoustic model in the storage medium (294) in which the reconstructed acoustic model is stored. In this manner, it is possible to acquire an acoustic model for which accuracy is improved by using the acoustic model read out from the recording medium (293) as an initial value, applying FMLLR to the feature using the acoustic model, and, then, converting the feature so that distribution of the first feature after the FMLLR is applied to the second training data matches distribution of the first training data, further estimating an FMLLR conversion matrix for the acoustic model so as to match the converted feature, generating a feature by multiplying the converted feature by the FMLLR conversion matrix and reconstructing the acoustic model using the created second feature. The reconstructed acoustic model is utilized for speech recognition in the same environment as the environment of the first training data. As shown at block 238, the computer (101) finishes the processing of improving an acoustic model.

FIG. 3A and FIG. 3B illustrate diagrams for explaining processing of improving an acoustic model at a call center, according to the aspects of the present invention. FIG. 3A illustrates a diagram for processing of improving an acoustic model at the call center, according to the aspects of the present invention. The call center (301) possesses large field data (390). Further, the call center (301) possesses an acoustic model (hereinafter, referred to as a "target domain acoustic model") (393) constructed from the large field data (390). However, the target domain acoustic model (393) is constructed using an old technique at the time of installation of the call center. Therefore, at the call center, it is tried to perform maintenance work for improving the target domain acoustic model (393) using the latest technique as one of measures for improving speech recognition.

An operating company of the call center (301) tries to outsource the maintenance work to an external company. However, the large field data (390) partly includes confidential information (personal information of personal who is a client), and thus cannot be provided to the external company. Therefore, the operating company of the call center (301) extracts part which does not include confidential information from the large field data (390) and provides the part (hereinafter, referred to as "small field data") (for example, data corresponding to approximately 30 minutes) (391) to the external company.

The external company tries to perform the following maintenance work for improving the target domain acoustic model (393) using the latest technique using a server computer (301). Further, the external company possesses available in-house data (for example, data corresponding to approximately 150 minutes) (392) which is required for the above maintenance work of the acoustic model.

As shown at block 312, the server computer (301) calculates a cepstrum from the small field data (391) and calculates standard deviation $\sigma\_field$ of the cepstrum to acquire a first standard deviation value. As shown at block 313, the server computer (301) calculates a cepstrum from the in-house data (392) and calculates standard deviation $\sigma\_in\text{-}house$ of the cepstrum to acquire a second standard deviation value. As shown at block 315, the server computer (301) multiplies the cepstrum of the in-house data (392) by $\sigma\_field/\sigma\_in\text{-}house$ to create a feature adapted to the environment where the small field data (391) is recorded. As shown at block 316, the server computer (301) creates a feature by applying FMLLR to the feature created as shown at block 315 using the target domain acoustic model (393).

As shown at block 317, when FMLLR is not applied, the server computer (301) reconstructs the target domain acoustic model (393) using the feature created as shown at block 315, or when FMLLR is applied, the server computer (301) reconstructs the target domain acoustic model (393) using the feature created as shown at block 316. The computer (101) stores the reconstructed acoustic model in a storage medium as an improved acoustic model (394). The external company provides the improved acoustic model (394) through a storage medium which can be utilized by the operating company of the call center (301). The operating company of the call center (301) uses the improved acoustic model (394) for speech recognition at the call center (that is, in the same environment as the environment where the large field data is recorded).

FIG. 3B illustrates a character error rate when the target domain acoustic model (393) of the call center is improved according to the aspects of the present invention and the improved acoustic model is used, as an example of the present invention, and a character error rate when the target domain acoustic model (393) of the call center constructed in the past is used as is or when the target domain acoustic model (393) is improved only using FMLLR according to the prior technique, as a comparison example.

For each of the target domain acoustic models (393) respectively obtained from the call center A and the call center B, the following experiments of the examples and the comparison examples were performed to improve the target domain acoustic model (393) constructed in the past from the large field data (390).

Example 1 corresponds to the processing of the flowchart illustrated in FIG. 2A. In Example 1, an acoustic model was improved by, for each of the target domain acoustic models (393) respectively obtained from the call center A and the call center B, among the diagram illustrated in FIG. 3A, omitting processing of block 316 (that is, in a case where the FMLLR is not applied), and in reconstruction of the target domain acoustic model (393) as shown at block 317, reconstructing the target domain acoustic model (393) using the feature created as shown at block 315. Speech recognition was respectively performed at the call center A and the call center B using the improved acoustic models, and the character error rates (CER) were calculated.

The above-described character error rate which is recognition rate assessment measure and a method in which matching is performed in units of character, is known to a person skilled in the art.

Example 2 corresponds to the processing of the flowchart illustrated in FIG. 2B. In Example 2, an acoustic model was improved by, for each of the target domain acoustic models (393) respectively obtained from the call center A and the call center B, among the diagram illustrated in FIG. 3A, executing the processing of block 316 (that is, in a case where the FMLLR is applied), and in reconstruction of the target domain acoustic model (393) of block 317, reconstructing the target domain acoustic model (393) using the feature created as shown at block 316. Speech recognition was performed at each of the call center A and the call center B using the improved acoustic models, and the character error rates were calculated.

In Comparison Example 1, speech recognition was performed at each of the call center A and the call center B using the target domain acoustic models (393) respectively obtained from the call center A and the call center B, and the character error rates were calculated.

In Comparison Example 2, an acoustic model was improved by using the target domain acoustic models (393) respectively obtained from the call center A and the call center B, and, among the diagram illustrated in FIG. 3A, omitting blocks 312 to 315, and in the processing of block 316, creating the feature by applying FMLLR to the cepstrum of the in-house data (392) using the target domain acoustic model (393), and, in reconstruction of the target domain acoustic model (393) of block 317, reconstructing the target domain acoustic model (393) using the feature created from the in-house data. Speech recognition was performed at each of the call center A and the call center B using the improved acoustic models, and the character error rates were calculated.

By the way, in the reconstruction of the acoustic model, processing is performed in order from (1) estimation of a maximum likelihood of Hidden Markov Model (HMM)—Gaussian Mixture Model (GMM), (2) discrimination training of a feature region, and (3) discrimination training in a model region.

At the call center A, for the target domain acoustic model (393), the above-described (1) estimation of a maximum likelihood of Hidden Markov Model—Gaussian Mixture Model and (2) discrimination training of a feature region have been already performed, and (3) discrimination training in a model region was performed using the feature according to the aspects of the present invention. It should be noted that in Comparison Example 2 for the call center A, the processing of the above-described (3) was performed using the feature created by applying FMLLR without using the aspects of the present invention.

At the call center B, for the target domain acoustic model (393), the above-described (1) estimation of a maximum likelihood of Hidden Markov Model—Gaussian Mixture Model has been already performed, and (2) discrimination training of a feature region and (3) discrimination training in a model region were performed using the feature according to the aspects of the present invention. It should be noted that in Comparison Example 2 for the call center B, the processing of the above-described (2) and (3) was performed using the feature created by applying FMLLR without using the aspects of the present invention.

For each of the call center A and the call center B, results of character error rates in Examples 1 and 2 and Comparison Examples 1 and 2 are illustrated in a table of FIG. 3B. In a case of the call center A, the character error rate was 0.2% improved in Example 1 compared to Comparison Example 1. Further, the character error rate was 0.6% improved in Example 2 compared to Comparison Example 1. Still further, the character error rate was 0.3% improved in Example 2 compared to Comparison Example 2.

In a case of the call center B, the character error rate was 5.2% improved in Example 1 compared to Comparison Example 1. Further, the character error rate was 6.0% improved in Example 2 compared to Comparison Example 1. It should be noted that in Comparison Example 2, even if a training method is changed in various manners, the character error rate does not fall below 54.0.

FIG. 4 illustrates an example of a functional block diagram of a computer which preferably has a hardware structure according to FIG. 1A or FIG. 1B and which implements the aspects of the present invention according to the flowcharts illustrated in FIG. 2A to FIG. 2D. A computer (401) can correspond to the computer (101) illustrated in FIG. 1A or the computer (121) illustrated in FIG. 1B. The computer (401) includes a standard deviation value calculating unit (411), a feature creating unit (412) and an acoustic model reconstructing unit (413). Further, the computer (401) can arbitrarily include an FMLLR applying unit (414). The standard deviation value calculating unit (411) reads out first training data from a recording medium (491) in which the first training data is stored, calculates a feature from the first training data, and calculates standard deviation of the feature to acquire a first standard deviation value, and reads out second training data acquired in a different environment from an environment of the first training data from a recording medium (492) in which the second training data is stored, calculates a feature from the second training data, and calculates standard deviation of the feature to acquire a second standard deviation value.

Further, the standard deviation value calculating unit (411) can execute blocks 202 and 203 illustrated in FIG. 2A, blocks 212 and 213 illustrated in FIG. 2B, blocks 222 and 223 illustrated in FIG. 2C and blocks 232 and 233 illustrated in FIG. 2D. Further, the feature creating unit (412) creates a feature adapted to an environment where the first training data is recorded, by multiplying the feature acquired from the second training data or the feature created by applying FMLLR to the feature acquired from the second training data using the target domain acoustic model (493) by the ratio obtained by dividing the first standard deviation value by the second standard deviation value. Further, the feature creating unit (412) can execute block 205 illustrated in FIG. 2A, block 215 illustrated in FIG. 2B, block 225 illustrated in FIG. 2C and block 235 illustrated in FIG. 2D. The acoustic model reconstructing unit (413) reconstructs the acoustic model (that is, the target domain acoustic model (493)) constructed using training data acquired in the same environment as the environment of the first training data, using the feature adapted to the environment where the first training data is recorded.

Further, the acoustic model reconstructing unit (413) can execute block 207 illustrated in FIG. 2A, block 217 illustrated in FIG. 2B, block 227 illustrated in FIG. 2C and block 237 illustrated in FIG. 2D. The FMLLR applying unit (414) creates a feature by applying FMLLR to the feature created by the feature creating unit (412) or the feature acquired from the second training data (492) at the standard deviation value calculating unit (411), using the target domain acoustic model (493). Further, the FMLLR applying unit (414) can execute block 216 illustrated in FIG. 2B, block 224 illustrated in FIG. 2C and blocks 234 and 236 illustrated in FIG. 2D.

As illustrated in FIG. 5, when a speech recognition system is constructed in a given call center, generally, a target domain acoustic model (503) is constructed using large field data (501) recorded at the call center (504). It should be noted that the field data is speech data recorded under the same environment conditions as those at the time when the acoustic models are actually operated. However, in a stage of the above-described maintenance work, the large field data is not always available (501), because the field data includes confidential information (for example, personal information), and there is a case where the field data cannot be utilized for a reason of security, or the like.

Further, as available data, there is data (for example, in-house data (502)) which is separately recorded in an environment different from the above-described call center. However, since there is acoustic mismatch between the in-house data (502) and the field data (for example, the large field data (501)) (511), accuracy of the already constructed acoustic model (503) cannot be expected to be improved merely by simply utilizing the in-house data (502).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for improving an acoustic model, comprising:
    acquiring, by a computer, a first standard deviation value by calculating standard deviation of a first feature from a first training data acquired in first environment;
    acquiring, by the computer, a second standard deviation value by calculating standard deviation of a second feature from second training data acquired in a second environment;
    calculating, by the computer, a modified first feature, by multiplying the second feature acquired from the second training data by a ratio obtained by dividing the first standard deviation value by the second standard deviation value;
    reconstructing, by the computer, an acoustic model constructed using training data acquired in the first environment, using the modified first feature;
    acquiring speech data for speech recognition; and
    performing speech recognition on the speech data using the reconstructed acoustic model.

2. The method according to claim 1, wherein environment includes the recording hardware and software used to acquire training data, and wherein the feature is a ceptsrum, and wherein the first training data is speech data recorded under the same conditions as conditions of an operation environment, and the second training data is speech data recorded under different conditions from conditions of the operation environment.

\* \* \* \* \*